United States Patent [19]

Imahashi et al.

[11] Patent Number: 4,573,629

[45] Date of Patent: Mar. 4, 1986

[54] METHOD OF PRODUCTION OF CLADDING TUBE FOR NUCLEAR FUEL ELEMENT

[75] Inventors: Hiromichi Imahashi, Hitachi; Akira Kawahara, Ibaraki; Takao Konishi; Yoshihumi Morimoto, both of Nishinomiya; Michio Terui, Tokyo; Yoshio Yagi, Toda, all of Japan

[73] Assignees: Hitachi, Ltd., Tokyo; Sumitomo Metal Industries, Ltd., Osaka; Nippon Mining Co., Ltd., Tokyo, all of Japan

[21] Appl. No.: 291,330

[22] Filed: Aug. 10, 1981

[30] Foreign Application Priority Data

Aug. 15, 1980 [JP] Japan .............................. 55-111630

[51] Int. Cl.⁴ .............................................. B21D 39/00
[52] U.S. Cl. .................................. 228/173.2; 228/186
[58] Field of Search .................. 226/173 A, 186, 243, 226/131; 72/62

[56] References Cited

U.S. PATENT DOCUMENTS

| 119,725 | 10/1871 | Thompson | 72/62 |
| 3,121,949 | 2/1964 | Wright | 228/186 |
| 4,015,765 | 4/1977 | Ahmed | 228/173 A |
| 4,049,184 | 9/1977 | Rozengart | 228/243 |
| 4,162,758 | 7/1979 | Mikarai | 228/173 A |
| 4,200,492 | 4/1980 | Armijo | 376/417 |
| 4,320,568 | 3/1982 | Herrod | 29/507 |

FOREIGN PATENT DOCUMENTS 54-61060 5/1979 Japan .................................. 228/186

*Primary Examiner*—Nicholas P. Godici
*Attorney, Agent, or Firm*—Beall Law Offices

[57] ABSTRACT

A method of production of a cladding tube for a nuclear fuel element wherein a first hollow billet of a zirconium alloy and a second hollow billet of zirconium having a smaller outer diameter than the first hollow billet are formed by heat treatment, forging and cutting. A resilient member is inserted in a space defined between the first hollow billet and the second hollow billet inserted in the first hollow billet, a pressure oriented axially of the two hollow billets is applied to the resilient member to bring the outer wall surface of the second hollow billet into intimate contact with the inner wall surface of the first hollow billet, and opposite ends of the two hollow billets are joined and sealed. The hollow billets thus joined into a unitary structure are subjected to hot extrusion, cold working and heat treatment to produce a composite tube of reduced diameter and reduced thickness, and the inner and outer wall surfaces of the composite tube are ground.

15 Claims, 9 Drawing Figures

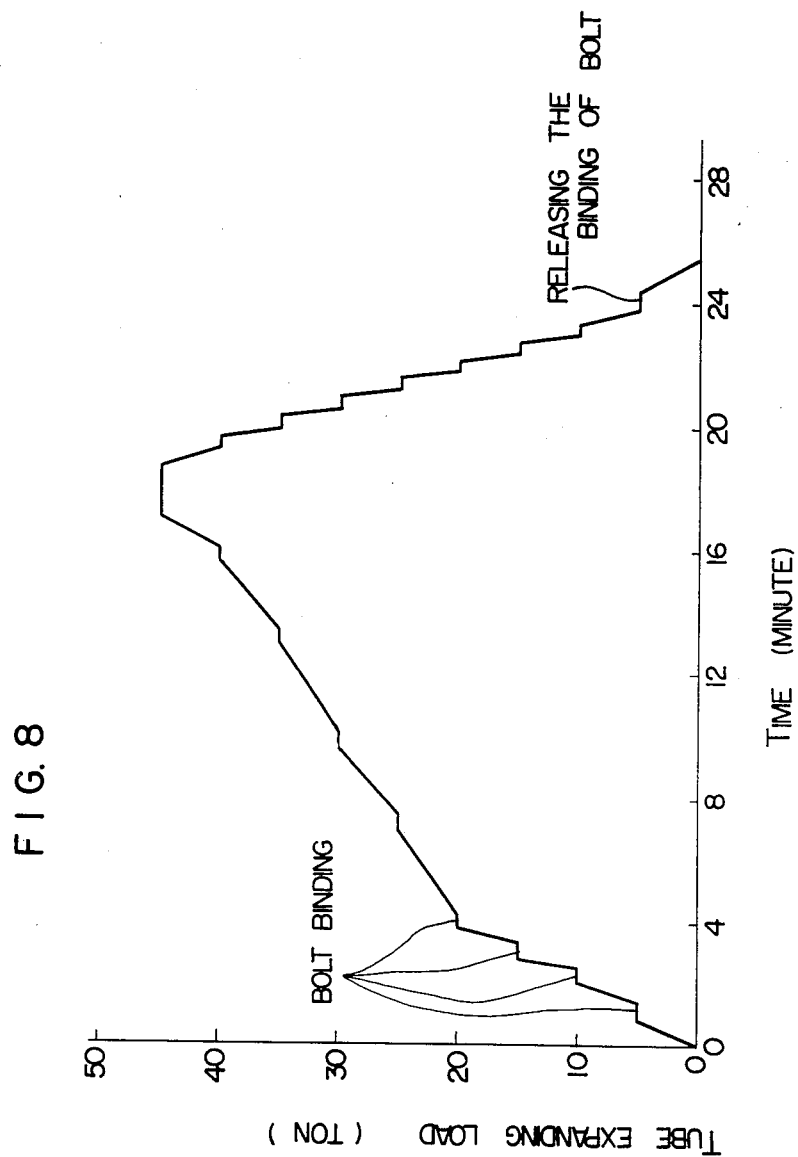

METHOD OF PRODUCTION OF CLADDING TUBE FOR NUCLEAR FUEL ELEMENT

BACKGROUND OF THE INVENTION

This invention relates to fuel elements for nuclear reactors, and more particularly it deals with a novel method of production of a composite type cladding tube including a metallic liner of zirconium on the inner wall surface of a zirconium alloy tube.

Nuclear fuel elements for constituting the core of a power reactor designed, produced and operated nowadays each include nuclear fuel material contained in a cladding tube of high corrosion resistance, nonreactivity and good thermal conductivity. Such fuel elements are arranged in an array in lattice form at regular intervals to provide a nuclear fuel assembly, and a plurality of nuclear fuel assemblies of a suitable number form a conglomerate of a nuclear fission chain reactor type or a reactor core capable of carrying out a self-maintaining nuclear fission. The reactor core is placed in a pressure vessel through which coolant flows.

The cladding is used for various purposes. One of its two main objects is to prevent chemical reaction between nuclear fuel and coolant or between nuclear fuel and moderator. The second object is to prevent radioactive nuclear fission products, which are in part gaseous, from leaking into the coolant or moderator from the fuel. Cladding material usually used is stainless steel or zirconium alloys.

When a certain type of metal or alloy is used as the cladding material for producing and operating nuclear fuel elements, the cladding material undergoes mechanical and chemical reactions under specific conditions. Various problems have been caused from this fact. Zirconium and its alloys are excellent nuclear fuel cladding materials under steadystate operational conditions. This quality is attributed to the fact that zirconium and its alloys have a small neutron-absorption cross section and are strong, ductile, very stable and nonreactive in the presence of pure water or steam usually used as coolant and moderator in a nuclear reactor at a temperature below about 400° C.

However, cladding materials have a problem because embrittlement occurs due to the interaction between the nuclear fuel, cladding and the nuclear fission products produced by the nuclear fission reaction, with a result that crack formation tends to occur in the cladding. It has been ascertained that this behavior of the cladding materials is promoted by mechanical stresses that are produced locally in the cladding due to the difference in thermal expansion between the fuel and cladding. During operation of a nuclear reactor, nuclear fission products are released from the nuclear fuel due to fission reaction and exist on the surface of the cladding. In the presence of specific nuclear fission products such as iodine and cadmium etc. stress corrosion cracking occurs due to the action of local stresses and strain.

As disclosed in U.S. Pat. No. 4,200,492 and U.S. Ser. No. 522,856 dated Nov. 11, 1974, proposals have been made to provide various types of metallic liners between the fuel and cladding to avoid the aforesaid problem. Of all the metallic liners that have hitherto been proposed, the liner which is believed to have the brightest prospect is a coating of zirconium of a suitable purity provided as a lining to the inner wall surface of a zirconium alloy cladding tube. The thickness of the zirconium liner is about 5-30% that of the cladding tube. Zirconium which is better able to remain in a soft state than zirconium alloys during irradiation by neutrons has the effect of reducing local strain in the nuclear fuel element, to thereby protect the cladding tube from stress corrosion cracking and liquid metal embrittlement. An additional feature of zirconium is that it does not involve the problems of neutron capture penalty, heat transfer penalty and incompatibility of material. Besides zirconium, nickel and copper may also be used to provide a metallic liner.

This type of composite cladding type is usually produced by the following process. As shown in FIG. 1, a zirconium ingot for producing a metallic liner and a zirconium alloy ingot for producing cladding material are produced by the melting of briquettes. Then the ingots are subjected to heat treatment, forging and machining to form a second hollow billet of zirconium and a first hollow billet of zirconium alloy. The second hollow billet is inserted in the first hollow billet, and they are formed into a unitary structure either by explosion joining or diffusion joining, to provide a composite billet. The composite billet produced in this way is extruded by a usual hot extrusion process at a high temperature of about 550°–750° C. Then the extruded composite tube is subjected to a usual tube making process by use of cold rolling, to provide a finished cladding tube of the desired dimensions.

It is necessary that a composite type cladding tube produced by the aforesaid process have the thickness of its zirconium liner controlled to the desired value and have its zirconium liner completely joined over its entire area to the cladding material in metallurgical bonding. To this end, the second hollow billet (inner tube) of zirconium should be unitary with the first hollow billet (outer tube) of zirconium alloy when they are formed into a composite billet, and the composite billet should be deformed in a unitary condition when subjected to extrusion and tube making working. To obtain a unitary structure in a composite billet, there is adopted herein a process disclosed in U.S. patent application filed Apr. 15, 1981 and assigned Ser. No. 254,297, claiming Convention priority based on Japanese Patent Application No. 50748/80.

It has been desired that, in order to obtain a cladding tube for nuclear fuel elements in which tube a zirconium liner is in a uniform and good joinder in the whole interface, there is realized a method of producing composite type cladding tube comprising the above-mentioned process for obtaining a composite billet of a unitary structure.

This invention has as its object the provision of a novel method of production of a cladding tube of a composite type.

One outstanding characteristic of the invention is that the method according to the invention comprises the step of mechanically joining a second hollow billet (inner tube) of zirconium to a first hollow billet (inner tube) of zirconium alloy. That is, following insertion of the inner tube of zirconium into the outer tube of zirconium alloy, a resilient member serving as a pressing medium having a greater axial length than the inner tube is inserted in the inner tube. Then an axial compressive load is applied to the pressing medium from outside, to bring the outer surface of the inner tube into intimate pressure contact with the inner surface of the outer tube. The feature of the invention is that the use of a resilient member as a pressing medium enables a force to be exerted uniformly on the inner tube both axially and circumferentially, because the pressing medium behaves in the same manner as fluid. Also, control of the force can be readily effected so that it is possible to achieve pressure bonding of high reliability without causing deformation or any change in the thickness of the inner tube of zirconium.

The present invention is based on the discovery made in the process of expanding a tube which is to be described hereinafter.

A load for expanding a tube can be obtained by the following equation:

$$W = PA_r/\eta \qquad (1)$$

where
W: tube expanding load (kg).
P: tube expanding pressure (kg weight/cm$^2$).
$A_r$: cross-sectional area of tube expanding rubber member (mm$^2$).
$\eta$: tube expanding efficiency (0.85-0.9).

FIG. 3 shows the results of tests in which there is shown the relation between bonding strength measured by drawing and the tube expanding pressure applied to the inner tube of zirconium according to equation (1). It will be seen that the higher the tube expanding pressure, the higher becomes the bonding strength. The bonding strength measured by drawing refers to a load required for separating the inner tube from the outer tube of the composite tube after the composite is produced by the tube expansion. In producing a composite fuel cladding tube, it is preferable to increase the bonding strength because the composite billet obtained is subjected to hot extrusion and tube contraction working at a working rate of over 80%. Experiments were conducted by the inventors to determine the lower limit of the preferable bonding strength. The results obtained show that the bonding strength of a composite cladding billet should be preferably within the range indicated by a hatch in FIG. 3.

Further, it has been found out by the inventors that in order to control the thickness of a zirconium liner of a composite type cladding tube to a desired level, the ratio of the thickness of the inner member of zirconium to that of the outer member of zirconium alloy at the time of tube expansion plays an important role. The thickness ratio is expressed by the following equation:

$$t = \frac{Z_r}{Z_{ry} + Z} \times 100 \ (\%),$$

where
t: thickness ratio.
$Z_r$: thickness of inner member of zirconium.
$Z_{ry}$: thickness of outer member of zirconium alloy.

Experiments were conducted regarding tube expansion by varying the ratio of thickness of the inner member of zirconium to that of the outer member of zirconium alloy, and the final thickness ratio was obtained by producing a composite type cladding tube of the final stage. The results show that the thickness ratio at the final stage is lower by 5-10% than at the time of initial tube expansion. This is attributed to the fact that zirconium is easier to work or deformed than zirconium alloys. Thus it has been ascertained that in order to obtain the desired thickness for the zirconium liner, the thickness ratio should be increased by 5-10% at the time of the tube expansion as compared with the desired thickness ratio of the cladding tube obtained as a completed product.

Another outstanding characteristic of the invention is that the interface between the inner and outer member of the composite billet is joined and hermetically sealed at opposite ends of the billet. Joining and sealing of the opposite ends of the cladding billet is achieved by electron beam welding, preferably by electron beam welding in high vacuum. By subjecting the composite type cladding billet to electron beam welding to close the opposite ends of the inner and outer tubes, and inner and outer tubes are rendered unitary with greater precision and no residual air is present between the surfaces of the two tubes contacting each other, so that joining of the two tubes is not prejudiced in any way by oxidation that might otherwise occur when hot extrusion is subsequently performed. In the electron beam welding, there can be minimized the degree of thermal effect caused by the welding as compared with other welding techniques, so that the grain growth of zirconium in the thermally affected zones into coarse grains is prevented thereby preventing grain growth which might adversely effect the subsequent working and the characteristics.

A still another outstanding characteristic of the invention is that it is possible to control the thickness of the zirconium liner of the composite type cladding tube. As described hereinabove, it is necessary to control the thickness of a zirconium liner to the desired value, in order to produce a composite type cladding tube of high reliability in performance. This control is effected according to the invention by polishing the inner surface of the cladding tube in the final finishing step.

Polishing of the inner surface may be carried out either mechanically by using a sand blast or through chemical polishing by using a mixture of nitric acid and fluoric acid or by a combination of the two processes. By suitably controlling the conditions (pressure, flow velocity, flow rate, time, etc.) of operation, it is possible to optimally control the thickness of the inner wall surface of the zirconium liner by varying the amount of polishing of the inner surface. By performing polishing of the inner surface of the cladding tube, it is possible to obtain a smooth surface on the inner wall surface of the zirconium inner tube.

By virtue of the aforesaid outstanding characteristics, the present invention is capable of providing a method of production of a composite type cladding tube having an increased precision in the thickness of the zirconium liner and an improved joining of the zirconium liner to the cladding over the entire area as compared with composite type cladding tubes provided by methods of the prior art.

Additional objects, features and advantages of the invention will become apparent from the description set forth hereinafter when considered in conjunction with the accompanying drawings.

BRIEF DESCRIPTION OF THE DRAWINGS

FIG. 8 is a graph showing a relation between the tube expanding load and the period of time during the tube expansion.

In order to describe more specifically, examples will now be described in some detail. Standard Zircaloy-2, an alloy of zirconium with low percentages of tin, iron, chromium and nickel, conforming to ASTMB353 grade R60802 was melted by arc melting to produce a first hollow billet. Preferably, the zirconium alloy consists essentially, by weight, of 1.5% Sn, 0.15% Fe, 0.07% Cr, 0.05% Ni with the balance being Zr. A second hollow billet serving as a metallic liner was produced by melting sponge zirconium of high purity by arc melting to produce a pure zirconium ingot. The oxygen content was about 500 ppm.

The two ingots were subjected to hot forging, particularly the ingot of the zirconium alloy-2 being hot-forged in $\beta$ phase temperature range, and the zirconium alloy-2 was subjected to solution heat treatment while the zirconium was subjected to annealing before they were finished to predetermined dimensions by turning operations. Table 1 shows the finished dimensions.

TABLE 1

| Specimen | Zirconium alloy Outer Billet Length × Outer Dia. × Inner Dia. (mm) | Zirconium Inner Billet Length × Outer Dia. × Inner Dia. (mm) |
| --- | --- | --- |
| 1 | 350.0 × 140.55 × 69.55 | 353.0 × 69.40 × 48.40 |
| 2 | 350.0 × 140.55 × 69.60 | 353.0 × 69.35 × 48.40 |

Figure 1:
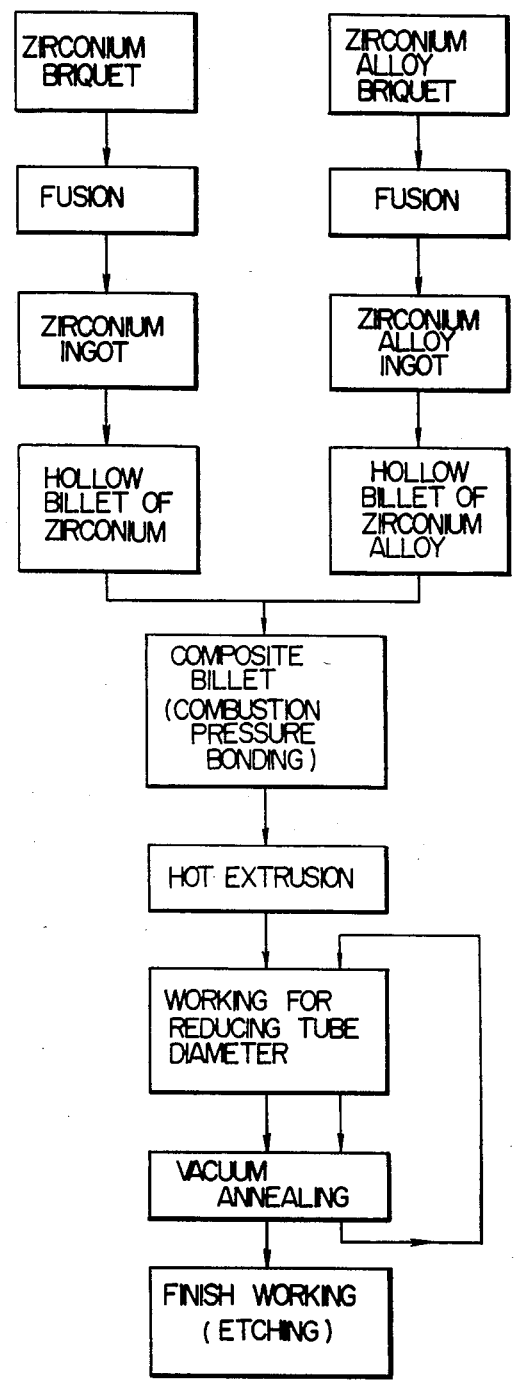
FIG. 1 is a flow chart of a production process of the prior art.
Figure 2:
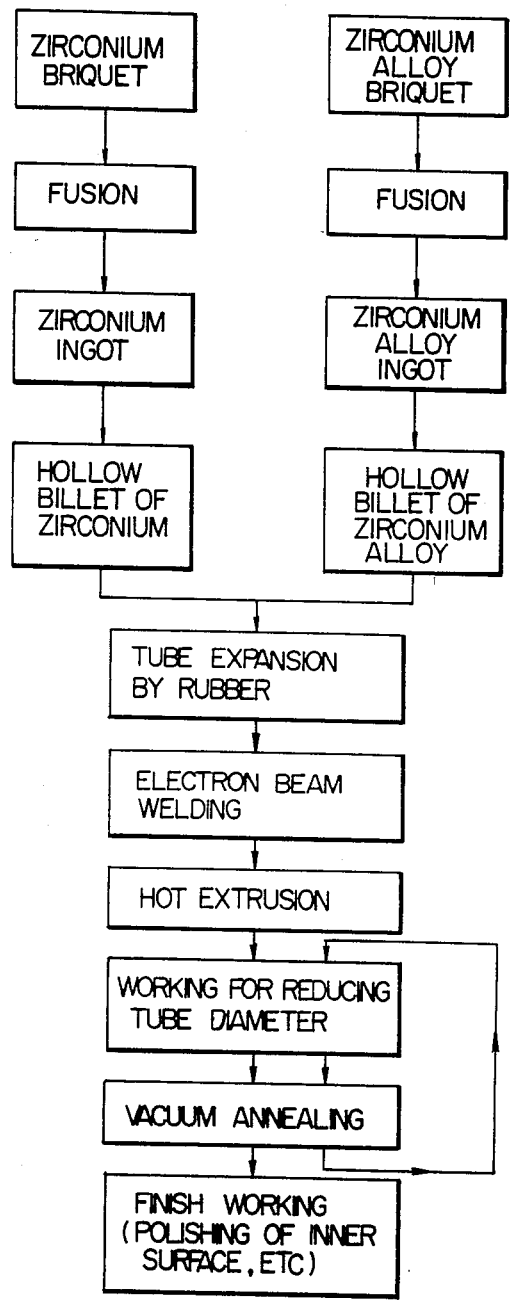
FIG. 2 is a flow chart of the production process comprising one embodiment of the invention.
Figure 3:
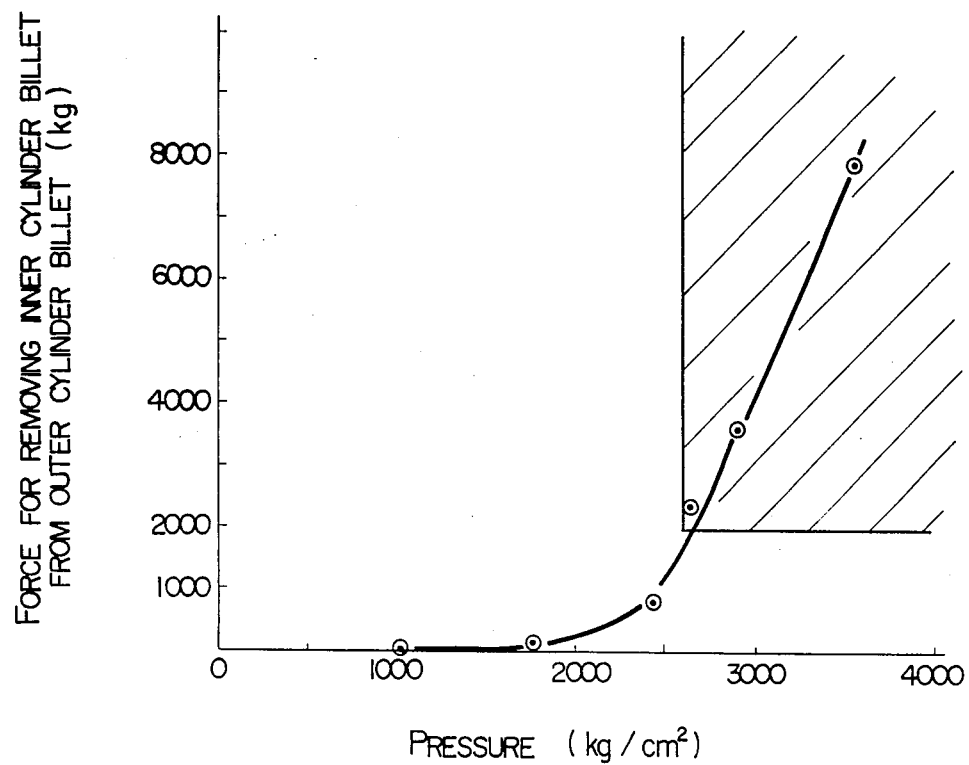
FIG. 3 is a diagrammatic representation of the conditions for tube expansion according to the invention.
Figure 4:
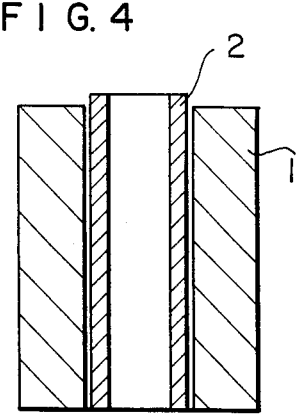
FIG. 4 is a vertical sectional view of a composite billet according to the invention prior to being subjected to tube expansion.
Figure 5:
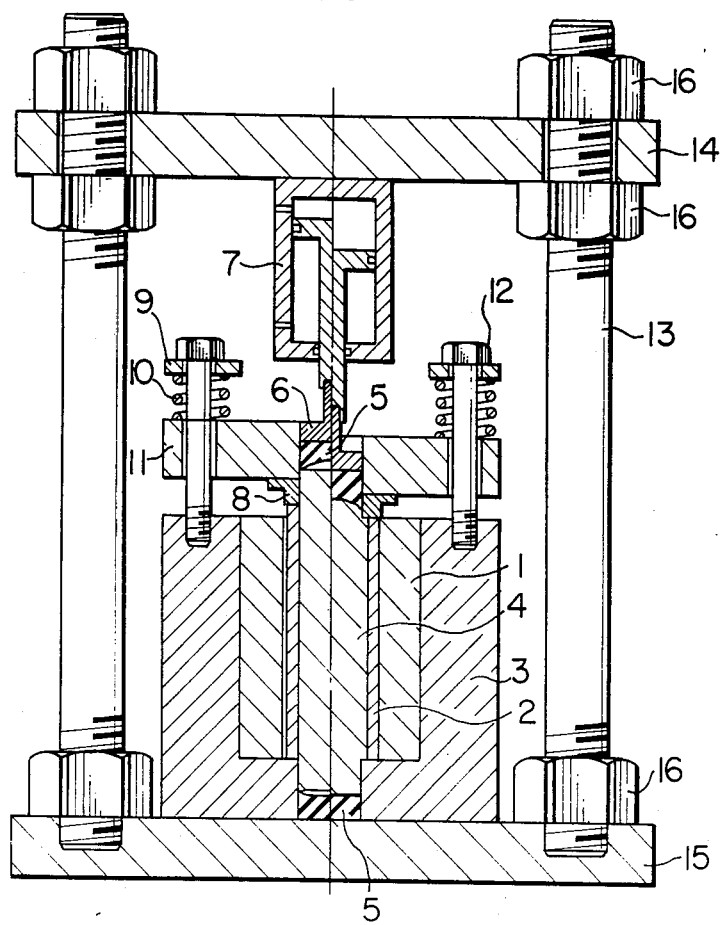
FIG. 5 is a vertical sectional view showing the manner in which tube expanding is carried out according to the invention.

These two hollow billets were assembled into a composite billet as shown in FIG. 4 by inserting the second hollow billet (inner tube) 2 into the first hollow billet (first tube) 1. FIG. 5 shows a device for tube expansion and the manner in which the composite billet has its inner and outer tubes 1 and 2 joined to each other mechanically into a unitary structure. As shown, the composite billet of the left half is before it is expanded and that of the right half is after it is expanded. The device comprises bases 14, 15 set through support members 13 by nuts 16, a restraining frame 3, a resilient member 4 of silicone rubber serving as a pressing medium inserted in the billet, seal rings 5 of urethane rubber mounted at opposite ends of the resilient member 4, a pressure applying rod 6 for applying an axial compressive load to the resilient member 4, a hydraulic cylinder 7 connected to the pressure applying rod 6 and a pressing member 8 secured to a lower end plate 11 and disposed on one end of the inner tube 2. As the composite billet is clamped to the restraining member 3, the pressing member 8 is forced against the inner tube 2. While the composite billet is in this condition, the hydraulic cylinder 7 is actuated to apply an axial compressive load to the resilient member 4 to compress the same axially, and to thereby expand the inner tube 2 radially into metallurgical bonding with the outer tube 1. As the inner tube 2 is radially expanded, the pressing member 8 is moved by the biasing force of springs 10 mounted on the end plate 11 by fastening bolts 12 and washers 9 a distance corresponding to the axial contraction of the inner tube 2, to thereby avoid outward plastic flow of the resilient member 4 through the gap. One of the features of the method according to the invention is that the resilient member 4 has an axial length greater than that of the composite billet to enable the inner billet 2 to be uniformly joined to the outer billet 1 from one end to another end of the billet.

By using the aforesaid device, the specimens 1 and 2 were joined to each other by applying a tube expanding pressure of 3000 kg (in weight)/cm² to provide composite billets. Tests show that no deformation or non-uniformity of the thickness of the inner tube 2 has occurred in all the composite billets produced.

Figure 6:
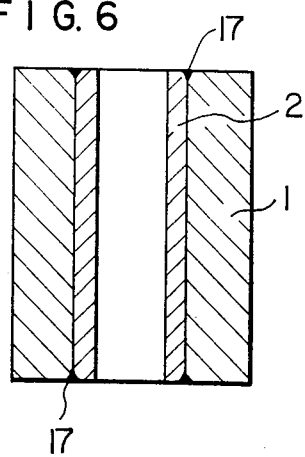
FIG. 6 is a vertical sectional view of a composite billet ready for hot extrusion working, completed by means of electron beam welding according to the invention.
Figure 9:
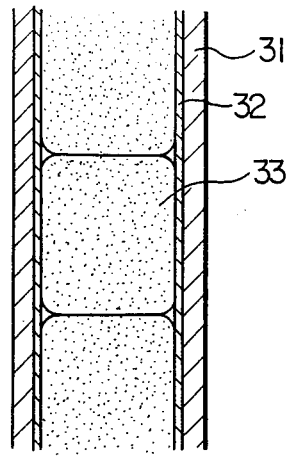
FIG. 9 is a sectional view showing a part of a composite type cladding tube in which nuclear fuel is inserted.

As shown in FIG. 6, the composite billets mechanically joined as aforesaid were each further brought to a unitary structure by subjecting interfaces existing at opposite ends thereof to electron beam welding in high vacuum. Both specimens 1 and 2 shown in Table 1 were joined at opposite ends thereof by electron beam welding in a high vacuum of $5-6 \times 10^{-5}$ Torr, with a depth of penetration of about 22 mm. The numeral 17 designates welds.

Following the electron beam welding, the whole of the composite billet were each covered by copper layers by use of a copper inner tube of 3 mm in thickness inserted in contact with the interior of the composite billet, a copper outer tube of 2 mm in thickness disposed onto the outer periphery of the composite billet, and copper plates each disposed in contact with each end of the billet, all of which copper members are fixed to the composite billet by caulking. The composite billet covered by the copper layers is then subjected to hot extrusion under the following conditions, to provide an extruded tube: temperature of 700° C.; extrusion ratio of 7.6; and extrusion speed of 75 mm/sec. The copper coating applied to the extruded tube was completely removed by the immersion of the extruded tube in a 50% aqueous solution of nitric acid.

Thereafter the composite billet was worked on by following standard process steps used for producing nuclear fuel cladding tubes. That is, the composite tube was subjected to cold rolling to reduce its diameter and its thickness, and then annealed in a high vacuum ($10^{-3}$ to $10^{-4}$ Torr) to recover its softness. In annealing the composite tube for recovering the softness thereof, the operation was performed at 650° C. for 2 hours. The tube thus softened was subjected to further cold rolling. More specifically, the composite billet was cold-rolled at the reduction ratio of 51.2% at the first stage with the cold-rolled billet being annealed at 650° C. for 2 hours, then the billet being cold-rolled at the reduction ratio of 72.5% at the second stage together with the annealing at 650° C. for 2 hours after the cold rolling, at the final stage the billet being cold-rolled at the reduction ratio of 86.6% to obtain predetermined dimensions and the final annealing in vacuum was effected at 580° C. for 4 hours. The total reduction ratio is 98.2% and the rate of elongation of the billet is 55.5 times.

Following the final annealing, the cold-rolled tube was straightened and ground over the entire length thereof by means of sand blast regarding its inner surface and by means of centerless grinder regarding its outer surface.

Then a mixture of nitric acid and fluorine was allowed to flow through the bore of the tube to effect the chemical polishing of the inner surface thereof. Regarding the chemical polishing the time for performing the chemical polishing was suitably selected to control the thickness of the inner member of zirconium of the composite tube.

Table 2 shows the measurements of the dimensions of the tube finished at the final stage and the thickness of the zirconium liner thereof.

TABLE 2

| Specimen | Inner Diameter (mm) | Thickness (mm) | Thickness of Zirconium Shield (μm) | Total Length of Tube (mm) |
| --- | --- | --- | --- | --- |
| 1 | 10.80 | 0.86 | 80 ± 5 | 4000 |
| 2 | 10.80 | 0.86 | 80 ± 5 | 4000 |

Figure 7:
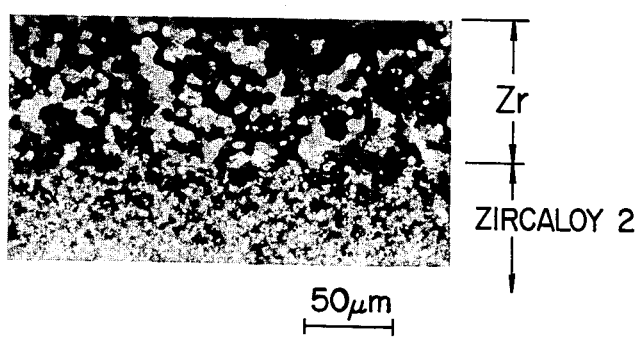
FIG. 7 is a photograph showing the microstructure of the cross section of a part of the composite type cladding tube produced by the method according to the invention.

The zirconium layer of the composite tube serving as metallic liner had a thickness of 80±5 μm through the entire length with enough precision. Ultrasonic wave tests and examination of the cross section of the composite tube have shown that the interface between the zirconium shield and the zirconium alloy cladding is free from defects and represents good metallurgical bonding through the entire length. FIG. 7 is a photograph showing the microstructure of the section of a part of the tube of specimen 1 shown in Table 2 in which about ⅓ of its lower portion in the photograph is constituted by zirconium alloy-2 finer in structure than its upper portion constituted by zirconium.

In the example shown and described herein above, sponge zirconium of high purity has been used as metallic liner. It is to be understood that the invention is not limited to this specific material for the metal liner and that sponge zirconium containing different amounts of impurities and other pure zirconium obtained from zirconium of crystal rod by use of an iodine process may be used with the same results. In the example shown and described hereinabove, copper has been described as being used for applying a coating to the composite tube. The invention is not limited to the use of this metal and that any lubricant may be used in place of copper.

From the foregoing description, it will be appreciated that the method of production of a composite type cladding tube having a zirconium liner according to the invention offers the following advantages:

(1) By effecting control of the dimensions of the composite billet and by effecting thickness control of the zirconium liner when the step of imparting finish polishing to the inner surface of the composite tube, it is possible to increase the precision with which the thickness of the metallic liner is controlled.

(2) The interface between the zirconium liner and the zirconium alloy cladding of the composite billet can be maintained in clean condition without being oxidized at the time of hot extrusion, so that good metallurgical bonding can be achieved by diffusion between the metallic liner and the cladding.

(3) The composite type cladding tube can be produced so long as its diameter is above 10 mm, even if its inner diameter is small.

(4) The method requires a shorter period of time than methods of the prior art regarding the working, and satisfactory control of operation conditions can be readily effected.

(5) Thermally affected regions are very small when welding is performed, so that local changes in material can be neglected.

(6) The need to subject the composite billet to diffusion treatment by prolonged holding at elevated temperature is eliminated, and the nuclear fuel cladding tube obtained is highly reliable in performance.

What is claimed is:

1. A method of producing a composite type cladding tube for a nuclear fuel element, comprising the steps of:

preparing a hollow outer billet of a nuclear fuel cladding material and a hollow inner billet having an outer diameter smaller than the inner diameter of the hollow outer billet;

inserting the hollow inner billet into the hollow outer billet;

inserting into the hollow inner billet a resilient member longer than the inner billet in length and disposed so that the end portions of said resilient member protrude axially outwardly from both ends of the inner billet;

inserting said outer and inner billets and said resilient member into a die;

applying pressure to the resilient member in the axial direction of the billets to force the inner billet against the outer billet to form a pressure bonding between an inner surface of the outer billet and an outer surface of the inner billet while preventing the resilient member from leaking that might otherwise be caused by a change in the axial length of the inner billet;

joining and hermetically sealing in a vacuum all of the interface portions existing at both ends of the pressure-bonded hollow billet;

working the integrally bonded hollow billet into a composite tube of a small diameter and thin thickness; and polishing the inner surface of the composite tube by use of both mechanical polishing and chemical polishing, thereby controlling the thickness of the inner tube portion to a desired level while controlling the whole of the composite tube to a uniform thickness.

2. A method of producing a composite type cladding tube for a nuclear fuel element, comprising the steps of:

preparing a hollow outer billet of a nuclear fuel cladding material and a hollow inner billet by forging, heat treating and machining, said hollow inner billet having an outer diameter smaller than the inner diameter of said hollow outer billet and having a length slightly greater than that of the hollow outer billet;

inserting the hollow inner billet into the hollow outer billet;

inserting into the hollow inner billet a resilient member longer than the hollow inner billet and disposed so that the end portions of said resilient member protrude axially outward from both ends of the inner billet;

inserting said outer and inner billets and said resilient member into a die;

applying pressure to the resilient member in the axial direction of the billets to force the inner billet against the outer billet to form a pressure bonding between an inner surface of the outer billet and an outer surface of the inner billet while preventing the resilient member from leaking that might otherwise be caused by a change in the axial length of the inner billet;

joining and hermetically sealing in a vacuum all of the interface portions existing at both ends of the pressure-bonded hollow billet;

subjecting the hollow billet to heat extrusion after applying a coating acting as a lubricant onto the surface of the billet;

cold-working the hot-extruded billet into a composite tube of a small diameter and thin thickness after the removal of the coating, by repeating the cold working and heat treatment of said billet; and polishing the inner surface of the composite tube by use of both mechanical polishing and chemical polishing, thereby controlling the thickness of the inner tube portion to a desired level while controlling the whole of the composite tube to a uniform thickness.

3. A method as claimed in claims 1 or 2, wherein said hollow inner billet is formed of zirconium.

4. A method as claimed in claims 1 or 2, wherein said hollow outer billet is formed of an alloy of zirconium, tin, iron, chromium and nickel.

5. A method as claimed in claim 4, wherein an ingot of said alloy is heated to a $\beta$ phase, forged, subjected to heat solution treatment and machining, to produce the first hollow billet.

6. A method as claimed in claims 1 or 2, wherein said resilient member is formed of silicone rubber.

7. A method as claimed in claims 1 or 2, wherein the joining and hermetically sealing of the interface portion existing at both ends of the pressure-bonded hollow billet is effected by electron beam welding.

8. A method as claimed in claims 1 or 2, wherein the ratio of the thickness of the hollow inner billet to the thickness of the hollow outer billet is greater by 5–10% than the corresponding ratio of the thickness of the inner member to the thickness of the outer member of a composite type cladding tube produced as a final cladding tube product.

9. A method as claimed in claims 1 or 2, wherein the pressure applied to the resilient member is over about 2600 kg weight/cm$^2$.

10. A method as claimed in claims 1 or 2, wherein the inner surface of the composite tube is first subjected to mechanical polishing and then subjected to chemical polishing.

11. A method as claimed in claims 1 or 2, wherein the polishing of the inner surface of the composite tube includes smoothing the inner surface of an inner liner and controlling the thickness of the inner liner.

12. A method as claimed in claim 1, wherein the step of preventing the resilient member from leaking comprises holding the ends of said inner billet in axial compression while applying said pressure to said resilient member.

13. A method as claimed in claim 2, wherein the step of preventing the resilient member from leaking comprises holding the ends of said inner billet in axial compression while applying said pressure to said resilient member.

14. A method as claimed in claim 1, comprising the steps of:

pressing the ends of said inner billet between a moveable member and said die while applying said pressure to said resilient member to compensate for changes in the axial length of said inner billet while applying pressure to said resilient member.

15. A method as claimed in claim 2, comprising the steps of:

pressing the ends of said inner billet between a moveable member and said die while applying said pressure to said resilient member to compensate for changes in the axial length of said inner billet while applying pressure to said resilient member.

* * * * *